United States Patent Office 2,746,872
Patented May 22, 1956

2,746,872

CITRUS FRUIT PACKAGING PAPER AND METHOD OF MOULD CONTROL THEREFOR

Robert G. Mispley, Camas, Wash., and John R. MacRill, Ontario, Calif., assignors to Crown Zellerbach Corporation, San Francisco, Calif., a corporation of Nevada No Drawing. Application February 17, 1954,
Serial No. 411,019

9 Claims. (Cl. 99—171)

This invention relates to citrus fruit packaging paper treated with diphenyl for inhibiting moulding of the fruit during shipment, storage, or when the fruit is held for any purpose, and more particularly to paper of such type impegnated with citrus oil of the group consisting of lemon oil and bergamot oil and a mixture thereof to neutralize odor that may result from the diphenyl. The application is a continuation in part of our copending application, Serial No. 110,664, filed August 16, 1949, now abandoned.

Diphenyl impregnated citrus fruit tissue paper wrappers of the type disclosed in United States Patent No. 2,173,453, dated September 19, 1939, have had wide commercial use. Not only can the diphenyl be impregnated in tissue paper as individual wrappers for the fruit, but it can also be incorporated in any other type of paper employed in the packaging of citrus fruits, such as paper liners for citrus fruit crates, the walls of paperboard boxes, or the inner plies or ply of multi-ply or wall paper bags in which the fruit is adapted to be packaged.

When fruit is packaged for a prolonged period in such wrappers or other packaging papers, a diphenyl odor may be noticed when the fruit is first unpackaged, and to some this odor may be objectionable. Such odor may be particularly noticeable when closed packages of the fruit, such as paper bags, are first opened, or upon opening of the doors of freight cars or other closed chambers in which crated tissue paper wrapped fruit may be shipped. This might lead one to believe that the fruit has become contaminated with the diphenyl odor, although not actually so as the odor disappears in a relatively short time under ventilation which occurs when the closed package or the doors of the shipping chamber are opened. Under some conditions of prolonged contact of the citrus fruit with the packaging paper, the skin of the fruit may absorb some of the diphenyl odor, which although not injurious to the meat of the fruit, may lead the ultimate purchaser of the fruit to believe it is contaminated, particularly if the fruit has been packaged in closed paper bags or boxes and has had little chance for ventilation.

Summarizing our invention, it comprises the incorporation of lemon oil or bergamot oil or a mixture of these oils with the diphenyl, which will neutralize the above odor, which is non-injurious to the fruit and is in fact beneficial therefor, and which can be easily and economically impregnated in the paper with the diphenyl.

In the search for a satisfactory substance of the character related, we have found that mere masking of the diphenyl odor is not the solution of the problem because numerous masking agents were tried and discarded, as they either had too marked an odor by themselves or imparted deleterious effects to the fruit. We have, however, discovered that only lemon oil, or bergamot oil which has an aroma akin to lemon oil, or a mixture of these oils, can be employed with the diphenyl to neutralize its odor and in fact impart beneficial effects to the fruit. Both of these oils are citrus oils; and as is well known, they are commonly obtained from the skins of their respective fruits, either by distillation, pressing or solvent extraction. Although we prefer the natural oil, synthetic lemon oil or synthetic bergamot oil can be used in place of the natural oil. Of the two oils, lemon oil is preferred because it produces the more beneficial and satisfactory results.

Other citrus oils, such as orange oil, lime oil or grapefruit oil are unsatisfactory, although it might be expected that since these oils are somewhat akin to lemon and bergamot oil, they might prove useful for the purpose specified. We are not sure why this is so but as a result of extensive tests, it is our belief that the fruit respiratory products (not the diphenyl alone) may be primarily responsible for the formation of the odor in the presence of the diphenyl incorporated in the packaging paper, particularly since these respiratory products do not readily dissipate in closed paper packages for the fruit. The lemon oil or the bergamot oil may have some neutralizing or inactivating effect on these respiratory products because perhaps of small quantities of constituents therein, not present in other citrus oils.

One might be led to believe that if the lemon or bergamot oil has a neutralizing effect on the respiratory products in the presence of the diphenyl, the citrus oil from any given species of the fruit would also have this effect on the same species of the fruit when incorporated with the diphenyl in the packaging paper therefor. This, however, has not been found to be the case, although the diphenyl-lemon or bergamot oil composition of our invention has been found entirely effective with all types of citrus fruits such as the orange, lemon, lime, grapefruit, etc.

In addition to neutralizing the diphenyl odor, the lemon or bergamot oil of our composition has been found to have a beneficial effect on citrus fruit which may be packaged in the packaging paper for the fruit, particularly where tissue paper wrappers are used. This is so because should the fruit become bruised in packaging or otherwise, the oil aids in the rapid formation of natural scar tissue which forms on the fruit to protect the same. Such scar tissue is formed by constituents in the natural oils that occur in the skin of the fruit; and the presence of the citrus oil of our composition in the packaging paper for the fruit, aids this scar tissue formation.

In preparing citrus fruits for packaging or shipment, it is customary to wash the fruit in a weakly alkaline solution, such as borax or borax and boric acid. Such washing results in removal of some of the natural oils occurring on the skin, which may make the fruit deficient in effecting this rapid formation of scar tissue. The citrus oil of our composition is, thus, helpful in compensating loss of natural oils. Also, it improves the gloss and appearance of the fruit, imparts a fresh invigorating odor thereto, and slows down the natural process of degeneration of the fruit.

With respect to our composition of diphenyl and lemon or bergamot oil, there are certain predetermined proportions that should be employed, the maximum amounts of which have been found critical. The criticality of the maximum amount of citrus oil will vary with the texture, and particular properties of the fruit dependent upon the region in which it grows and growing conditions. The amount of diphenyl can be best predicated on the total weight of citrus fruit which the paper is adapted to package. With respect to conventional tissue paper wrappers which come in intimate contact with the individual pieces of fruit, this amount should not exceed much over 0.022% (twenty-two thousandths of one percent) of the total weight of the fruit packaged. With respect to other packaging paper, such as the inner ply or plies of a multi-ply paper bag, crate liners, and the walls of paperboard boxes, the maximum amount of diphenyl may be greater depending on factors, such as area of the paper treated, the character of the packaging paper, and the particular type of package. If too much diphenyl is employed, delicately textured fruit, such as grapefruit or thin skinned oranges, may become adversely affected. Also, there is no substantial increase in decay control by employing excess diphenyl.

With respect to tissue paper wrappers, the amount of diphenyl specified, represents about the maximum quantity that can be incorporated in the paper without the diphenyl flaking off, or offering application problems in the paper making machine. Although any quantity of diphenyl up to the preferred maximum may be incorporated in the tissue paper wrapper, it has been determined by extensive tests that for minimum effective decay control, the amount of diphenyl in tissue paper wrapper should not be much below 0.012% (twelve thousandths of one percent) of the total weight of the fruit packaged in the paper. For export purposes, where the fruit is in transit a long time, we prefer to employ about the maximum amount of diphenyl in the tissue paper wrapper. For domestic use, approximately the minimum amount of diphenyl is preferred in such paper, as the fruit is not packaged for as long a period.

The range of percentages of the diphenyl set forth in the aforementioned patent, based on the bone dry weight of the tissue paper wrapper for the individual fruit, is substantially the range expressed herein and can be employed in tissue paper wrappers. This is so because commercial citrus fruit tissue wrapping paper weighs about 11.5 lbs. per 3000 sq. ft. on the bone dry basis; and, for example, the average individual orange wrapper is 11 in. or 121 sq. in. The weight of the average orange which is wrapped is about 0.45 lb.; and upon calculation, it will be found that the above expressed percentages will obtain for each orange wrapped. The average lemon is of course lighter than the average orange but being smaller, a smaller wrapper is employed, usually about 9 in. by 9 in. or 81 sq. in.; so there will be less diphenyl in the presence of the fruit. The reverse is true with respect to the heavier and larger grapefruit for which the average tissue paper wrapper is 15 in. by 15 in., or 225 sq. in.

With respect to crate lining paper, the walls of paperboard crates or boxes, and multi-ply paper bags an inner ply or plies of which may be impregnated with the diphenyl, the weight and the grade of the impregnated paper may vary considerably. The usual commercial bag employed for the packaging of citrus fruits will hold about 45 lbs. of the fruit; and the usual commercial crate for packaging such fruit will hold about 75 lbs. of the fruit. Hence, one can readily determine how much diphenyl should be incorporated in any particular grade and weight of paper intended for bag, crate liner, or crate wall use to provide the above percentage range, depending upon the amount of fruit in the package. However, as previously related, the maximum amount of diphenyl for such purposes may be greater because with such type of packages, each piece of fruit is not in intimate contact with the paper.

As for the quantity of our particular citrus oil that should be incorporated in the tissue paper wrapper, if our preferred lemon oil is utilized, an amount thereof approximately 1.75% to 2% of the weight of the diphenyl in our composition has been found preferable in neutralization of any odor that may be created by the diphenyl. As far as the neutralization of the diphenyl odor is concerned, this percentage could be materially increased. However, the percentage should not exceed a maximum critical amount because we have found that too much of the lemon oil will produce adverse effects on the fruit. If the quantity of the oil becomes too great, it may cause so-called burning or pitting of the fruit by forming excessive scar tissue thereon, and may adversely affect the flavor of the fruit.

The maximum amount of the lemon oil bears a critical relationship with respect to the weight of the fruit packaged but since the diphenyl percentage is expressed with respect to the weight of the fruit, the lemon oil range can be conveniently set forth with respect to the quantity of the diphenyl. However, as previously related, the maximum amount of lemon oil will vary with the texture, and particular properties of the citrus fruit depending upon the region in which it grows and growing conditions.

To avoid the above described adverse effects of too much lemon oil on the usual run of relatively thin skinned and delicately textured citrus fruits packaged in tissue paper wrappers in California and Arizona, the amount thereof should not exceed 2.75% of the weight of the maximum quantity of diphenyl that may be employed in our composition. If the amount of lemon oil is too small, no benefits will be obtained in neutralizing the diphenyl odor. For this reason, the lemon oil should not be much below 1.25% of the weight of the diphenyl. Thus, for California and Arizona citrus fruits, we may employ a minor amount of lemon oil in tissue paper wrappers varying from 1.25% to 2.75% of the weight of the diphenyl.

This maximum amount of lemon oil based on the amount of diphenyl suitable in tissue paper wrappers can be as much as 25.0% of the weight of the diphenyl in some especially highly resistant citrus fruits, such as some types of Florida russet oranges and grapefruit. However, for safe performance of the tissue paper wrapper with respect to highly resistant citrus fruits, the maximum amount of lemon oil should not exceed 6.0% by weight of the maximum quantity of diphenyl that may be employed.

What has been stated with respect to the lemon oil also applies in principle to the bergamot oil. However, the latter, although not as effective as lemon oil, has a stronger aroma. Consequently, if it is substituted for the lemon oil in any particular formulation, the percentage should be slightly less—approximately 5% less than the amount of the lemon oil. However, for all practical purposes, since the amounts are so small, the percentages may be considered the same as that expressed for the lemon oil. In this connection, any mixtures of the two oils may be utilized within the percentages expressed for the lemon oil.

If synthetic lemon or bergamot oils are employed in place of the natural oils, greater quantities should be utilized because the synthetic oils are usually not commercially available in full strength. The increase in quantity of the synthetic oil to provide the percentages expressed above for the natural oils, may be readily calculated from the strength of the synthetic oil utilized. In this connection, it is to be understood that in the claims, wherever the citrus oil is referred to, both the synthetic and the natural oil are embraced, and that expressions of oil percentages although based on the full strength natural oil or full strength synthetic oil are intended to embrace less than full strength oil employed in greater quantities commensurate with the percentages expressed for the full strength oil.

Insofar as mould control is concerned, any suitable solvent for both the diphenyl, and the lemon or bergamot oil may be employed as a carrier for effecting impregnation of tissue paper wrappers as well as the other types of packaging paper previously mentioned, with the composition of our invention in quantities which will provide the desired proportions in the paper. For example, carbon tetrachloride, chloroform, alcohols up to butyl, and ether could be employed. However, these solvents are relatively volatile, and therefore offer retention problems. Also, they have an odor which may be objectionable to the customer.

Mineral hydrocarbon solvents, particularly light colored and odorless mineral oils, are preferred. Of these, paraffin oil has been found most satisfactory because it imparts a certain degree of moisture proofness to the paper and minimizes shrinkage of the fruit by loss of moisture content, as is explained in the aforesaid patent No. 2,173,453, and at the same time lends itself readily to application in the paper making machine by the method described in such patent. The paraffin oil is especially adapted for the tissue paper wrappers because it imparts flexibility thereto which facilitates wrapping thereof about the fruit without cracking of the paper. However, the paraffin oil carrier is equally desirable for the other types of packaging papers previously mentioned.

Wax, preferably mineral waxes such as paraffin wax and microcrystalline wax, but which may be any other type of odorless wax relatively free of unsaturated compounds, such as refined beeswax and refined carnauba wax, is preferably incorporated in the diphenyl-citrus oil carrier to act as a seal in enhancing retention of the diphenyl in the paper. In this connection, it is desirable to avoid the use of a wax which has a substantial proportion of unsaturated compounds therein because upon oxidation of such compounds undesirable odors which may be absorbed by the skin of the fruit, may develop.

If too much wax is incorporated in the paraffin oil carrier, the resultant solution may become too viscous and offer problems with respect to machine roller application, and the paper treated with the composition may become too moisture resistant and thereby preclude adequate respiration of the fruit. For these reasons, we prefer not to exceed about 35% by weight of wax in the paraffin oil-wax carrier. Although the proportions of wax may vary widely, a carrier mixture ranging from about 10% to 35% by weight of paraffin wax and about 90% to 65% by weight of paraffin oil has been found suitable in tissue paper wrappers as well as other packaging papers, with respect to moisture control, respiration of the fruit, machine roller application as explained in the aforementioned patent, preservation of the fruit flavor, and the retention of the diphenyl and the lemon or bergamot oil in the impregnated paper by virtue of the seal which the wax provides.

Thus, our diphenyl-citrus oil and carrier composition preferably comprises the specified amounts of paraffin oil and paraffin wax together with sufficient of the diphenyl and the lemon or bergamot oil or a mixture of these oils, to provide the desired amount of the latter substances in the paper treated. The proportions of the diphenyl with respect to the carrier, specified in the aforesaid patent, namely, a quantity of diphenyl amounting to about 25% to 33% by weight of the paraffin oil-paraffin wax carrier composition is suitable for tissue paper wrappers, and the amount of the citrus oil incorporated in the carrier should bear the previously related ratio of 1.25% of the weight of diphenyl to 25% but preferably not exceeding 6% of the weight of the diphenyl.

Preferably, we employ paraffin oil of about 110 Saybolt viscosity (3.10-3.34 Engler degrees) and paraffin wax having a melting point in the range of 125° to 133° F. It is to be understood that these are our preferred particular compounds which have been found most satisfactory, as other mineral oils of different viscosities and other waxes of the type previously related may be employed as our preferred type of carrier for the diphenyl and the citrus oil.

A suitable formulation in percent by weight for tissue paper wrappers intended for the general run of citrus fruit grown in California and Arizona, and analogous relatively delicately textured citrus fruits, is as follows:

| | Per cent |
|---|---|
| Paraffin oil (110 Saybolt viscosity at 3.10-3.34 Engler degrees) | 65.7 |
| Paraffin wax (125/127 A. M. P.) | 11.0 |
| Diphenyl | 22.9 |
| Lemon oil | 0.4 |

The composition may be applied to the tissue paper wrapper to saturate or impregnate the same in any suitable manner, and in an amount sufficient to provide the desired quantities of the diphenyl and the citrus oil in the paper. We prefer to apply our composition by an applicator roll in the paper making machine, in the manner described in the previously mentioned patent, wherein the roll can be operated at such speed relative to the tissue paper wrapper as to apply the desired amount of our composition to the paper. Such amount is approximately 8.5% of the weight of the tissue paper based upon the bone dry weight thereof but may vary in the order described in the previously mentioned patent of from approximately 8.25% to 12% based on the bone dry weight of the tissue paper.

A suitable formulation for coating paper other than tissue paper wrappers, such as crate liners and walls of paperboard cartons, is as follows, in percent by weight:

| | Percent |
|---|---|
| Paraffin oil (110 Saybolt viscosity at 3.10-3.34 Engler degrees) | 34.0 |
| Paraffin wax (127/30 A. M. P.) | 15.0 |
| Diphenyl | 50.0 |
| Lemon oil | 1.0 |
| | 100.0 |

In this composition, the amount of diphenyl is approximately equal to the weight of the paraffin oil-paraffin wax carrier composition.

We claim:

1. The method of preserving packaged citrus fruit and controlling mould growth which comprises packaging the same with paper treated with diphenyl present in an amount sufficient to control decay but insufficient to cause adverse effects on the fruit, said paper being also treated with a citrus oil of the group consisting of lemon oil and bermagot oil and a mixture thereof in an amount not exceeding approximately 25% of the weight of diphenyl for protecting the fruit and neutralizing any odor that may be created by said diphenyl in the presence of the fruit.

2. The method of preserving packaged citrus fruit and controlling mould growth which comprises packaging the same with paper treated with diphenyl present in an amount sufficient to control decay but insufficient to cause adverse effects on the fruit, said paper being also treated with a citrus oil of the group consisting of lemon oil and bergamot oil and a mixture thereof for protecting the fruit and neutralizing any odor that may be created by said diphenyl in the presence of the fruit, the citrus oil being present in a minor proportion compared to the diphenyl but the quantity thereof being insufficient to cause pitting of the fruit.

3. Citrus fruit packaging paper treated with diphenyl present in an amount sufficient to control decay but insufficient to cause adverse effects on the fruit, and with a citrus oil of the group consisting of lemon oil and bergamot oil and a mixture thereof in a minor amount not exceeding approximately 25% by weight of the weight of diphenyl for protecting the fruit and neutralizing any odor that may be created by the diphenyl in the presence of the fruit.

4. Citrust fruit tissue wrapping paper treated with diphenyl, and a citrus oil of the group consisting of lemon oil and bergamot oil and a mixture thereof, the quantity of diphenyl not exceeding approximately 0.022% of the weight of the individual piece of fruit which said paper is adapted to wrap, and the amount of citrus oil not exceeding approximately 25% of the weight of said diphenyl.

5. Citrus fruit tissue wrapping paper treated with diphenyl and lemon oil, the quantity of diphenyl being approximately 0.012% to approximately 0.022% of the weight of the individual piece of fruit which said paper is adapted to wrap, and the amount of lemon oil being approximately 1.25% to approximately 6% of the weight of the diphenyl.

6. The citrus fruit tissue wrapping paper of claim 5 which is also treated with mineral oil and wax as a carrier for the diphenyl and citrus oil.

7. Citrust fruit tissue wrapping paper impregnated with a preservative composition comprising a carrier consisting essentially of approximately 10% to 35% by weight of paraffin wax and approximately 90% to 65% by weight of paraffin oil, an amount of diphenyl approximately 25% to 33% the weight of the carrier, and an amount of citrus oil not exceeding 6% of the weight of the diphenyl, said citrus oil being of the group consisting of lemon oil and bergamot oil and a mixture thereof, said preservative composition constituting about 8.25% to 12% of the weight the paper.

8. A preservative composition for the treatment of citrus fruit packaging paper comprising diphenyl, a citrus oil of the group consisting of lemon oil and bergamot oil and a mixture thereof, and a carrier for said citrus oil consisting essentially of paraffin oil and wax, the amount of the citrus oil being about 1.25% to 25% of the weight of said diphenyl.

9. The method of preserving packaged citrus fruit and controlling mould growth which comprises packaging each individual piece of fruit in intimate contact with a tissue paper wrapper treated with diphenyl present in an amount of at least approximately 0.012% of the weight of the individual piece of fruit which said paper is adapted to wrap to control decay but not exceeding approximately 0.022% of the weight of said fruit to preclude adverse effects on the fruit, said paper being also treated with a citrus oil of the group consisting of lemon oil and bergamot oil and a mixture thereof for protecting the fruit and neutralizing any odor that may be created by said diphenyl, the amount of oil being at least approximately 1.25% of the weight of diphenyl for neutralizing said odor but not exceeding approximately 25% of the weight of the diphenyl to preclude adverse effects on the fruit.

References Cited in the file of this patent

UNITED STATES PATENTS

| | | |
|---|---|---|
| 881,901 | Coburn | Mar. 17, 1908 |
| 2,173,453 | Mispley et al. | Sept. 19, 1939 |
| 2,602,030 | Dakis | July 1, 1952 |
| 2,607,694 | Rinck | Aug. 19, 1952 |

OTHER REFERENCES

Bates: Chemical Abstracts, vol. 31, 1937, page 7549.